United States Patent
Dao et al.

(10) Patent No.: US 10,313,855 B2
(45) Date of Patent: Jun. 4, 2019

(54) METHOD TO MANAGE SUBSCRIPTIONS IN A PROVISIONING SERVER

(71) Applicant: GEMALTO SA, Meudon (FR)

(72) Inventors: Frédéric Dao, Gemenos (FR); David Halle, Gemenos (FR); Jean-François Arnaud, Gemenos (FR); Jérôme Duprez, Gemenos (FR); Stephan Stankowski, Gemenos (FR); François Prigent, Gemenos (FR)

(73) Assignee: GEMALTO SA, Meudon (FR)

( * ) Notice: Subject to any disclaimer, the term of this patent is extended or adjusted under 35 U.S.C. 154(b) by 172 days.

(21) Appl. No.: 15/514,635

(22) PCT Filed: Sep. 17, 2015

(86) PCT No.: PCT/EP2015/071290
§ 371 (c)(1),
(2) Date: Mar. 27, 2017

(87) PCT Pub. No.: WO2016/058779
PCT Pub. Date: Apr. 21, 2016

(65) Prior Publication Data
US 2017/0222806 A1    Aug. 3, 2017

(30) Foreign Application Priority Data

Oct. 16, 2014 (EP) .................................. 14306640

(51) Int. Cl.
*H04W 4/60* (2018.01)
*H04L 29/06* (2006.01)
(Continued)

(52) U.S. Cl.
CPC ............. *H04W 4/60* (2018.02); *H04L 9/0897* (2013.01); *H04L 63/0428* (2013.01);
(Continued)

(58) Field of Classification Search
CPC ............... H04L 63/0428; H04L 63/061; H04L 63/0853; H04L 63/1441; H04L 9/0897; H04W 4/60; H04W 12/06
(Continued)

(56) References Cited

U.S. PATENT DOCUMENTS 9,439,076 B2 * 9/2016 Rudolph ............... H04W 8/205
2005/0083846 A1 * 4/2005 Bahl ..................... H04W 12/06
370/236

(Continued)

OTHER PUBLICATIONS

International Search Report (PCT/ISA/210) dated Oct. 26, 2015, by the European Patent Office as the International Searching Authority for International Application No. PCT/EP2015/071290.
(Continued)

*Primary Examiner* — Shahriar Zarrineh
(74) *Attorney, Agent, or Firm* — Buchanan Ingersoll & Rooney PC

(57) ABSTRACT

The present invention relates to a method to manage subscriptions in a provisioning server (PS) able to communicate with a Hardware Security Module (HSM) having an HSM key (K). Said method being such that the HSM comprising a load and a reload function, the secure device key ((Ke1)K) and the storage key ((Ks)K) as encrypted and stored are provided (S1) to one of said functions, said functions outputting, the storage key ((Ks)Ke1)K) encrypted using the provided secure device (SE1) key (Ke1) and the HSM key K, and an APDU_putkey command ((APDU_PUTKEY ((Ks)Ke1))Ke1), encrypted using the provided secure device (SE1) key (Ke1), to put the retrieved storage key ((Ks)Ke1) also encrypted using the provided secure device key (Ke1), the storage key as previously stored ((Ks)K) is overwritten (S6) with the storage key (((Ks)Ke1)K) encrypted using the secure device key (Ke1) and the HSM key (K) returned by the function.

10 Claims, 2 Drawing Sheets

(51) Int. Cl.
*H04W 12/06* (2009.01)
*H04L 9/08* (2006.01)

(52) U.S. Cl.
CPC ........ *H04L 63/061* (2013.01); *H04L 63/0853* (2013.01); *H04L 63/1441* (2013.01); *H04W 12/06* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 2005/0108534 | A1* | 5/2005 | Bajikar | G06F 21/606 713/172 |
| 2012/0190354 | A1* | 7/2012 | Merrien | H04W 4/70 455/422.1 |
| 2012/0331292 | A1 | 12/2012 | Haggerty et al. | |
| 2013/0012168 | A1* | 1/2013 | Rajadurai | H04L 9/0822 455/411 |
| 2013/0157673 | A1* | 6/2013 | Brusilovsky | H04W 4/70 455/450 |
| 2013/0185560 | A1* | 7/2013 | Eld | H04L 9/12 713/168 |
| 2013/0231087 | A1* | 9/2013 | O'Leary | H04W 8/22 455/411 |
| 2014/0011541 | A1* | 1/2014 | Cormier | H04W 8/183 455/558 |
| 2014/0031012 | A1* | 1/2014 | Park | H04W 12/06 455/411 |
| 2014/0031024 | A1* | 1/2014 | Xie | G06F 21/57 455/418 |
| 2014/0140507 | A1* | 5/2014 | Park | H04W 8/245 380/247 |
| 2014/0143534 | A1* | 5/2014 | Chastain | H04L 63/0428 713/150 |
| 2014/0329502 | A1* | 11/2014 | Lee | H04W 12/06 455/411 |
| 2015/0121495 | A1* | 4/2015 | Gao | H04W 12/04 726/6 |
| 2015/0349825 | A1* | 12/2015 | Lee | H04W 8/205 455/558 |
| 2015/0350219 | A1* | 12/2015 | Selander | H04L 63/102 726/1 |
| 2015/0350881 | A1* | 12/2015 | Weiss | H04W 8/205 455/558 |
| 2015/0350916 | A1* | 12/2015 | Selander | H04W 12/10 455/411 |
| 2016/0192179 | A1* | 6/2016 | Huber | H04W 76/10 455/411 |
| 2016/0249203 | A1* | 8/2016 | Mazali | H04W 8/205 |
| 2016/0316311 | A1* | 10/2016 | Holtmanns | H04W 12/06 |
| 2016/0316372 | A1* | 10/2016 | Daksiewicz | H04W 12/08 |

OTHER PUBLICATIONS

Written Opinion (PCT/ISA/237) dated Oct. 26, 2015, by the European Patent Office as the International Searching Authority for International Application No. PCT/EP2015/071290.
"3rd Generation Partnership Project; Technical Specification Group Services and System Aspects; Feasibility study on the security aspects of remote provisioning and change of subscription for Machine to Machine (M2M) equipment (Release 9)", 3GPP Standard; 3GPP TR 33.812, 3rd Generation Partnership Project (3GPP), Jun. 2010, pp. 1-87, XP050441986.

* cited by examiner

METHOD TO MANAGE SUBSCRIPTIONS IN A PROVISIONING SERVER

FIELD OF THE INVENTION

The present invention relates to a method to manage subscriptions in a provisioning server. More precisely, it concerns such provisioning servers able to communicate with a Hardware Security Module (HSM) having an HSM key.

The invention also pertains to a hardware security module using said method.

BACKGROUND OF THE INVENTION

Generally, a secure device, typically a secure element or an eUICC, may contain several subscriptions, loaded by a provisioning server. When the secure device has not enough memory, a customer may want to remove a subscription, to make room, and then reload it later on the same secure device when more memory space will be available. Automatic management profile methods on the secure device can also remove a downloaded profile.

However a mandatory requirement from all MNOs is to prevent cloning, i.e. loading the same subscription on more than one secure device.

It is currently known to add a simple association in the provisioning server when a subscription is loaded on a secure device, so that the server will refuse loading it on another secure device.

But if an attacker alters the provisioning server's database and removes this association, the provisioning server will not know it and accept loading it on any other secure device.

Further alternative and advantageous solutions would, accordingly be desirable in the art.

SUMMARY OF THE INVENTION

The present invention aims at avoiding any possibility of subscription's cloning on a plurality of secure devices.

The present invention is defined in broadest sense, as a method to manage subscriptions in a provisioning server able to communicate with a Hardware Security Module (HSM) having an HSM key, said method comprising the preliminary steps of:

storing, in the provisioning server, scripts corresponding to the creation of subscriptions (subscription creation scripts), said scripts being encrypted using a storage key, said scripts being intended to be loaded in secure devices, each of these secure devices being associated with a secure device key, storing said storage key and said secure device keys encrypted using the HSM key in the provisioning server, said method further comprising a load subscription phase comprising the following steps of, when the provisioning server is requested to load a given subscription on a secure device:

checking if the given script has been loaded on any secure device, in the case such a previous loading is not appearing, providing the secure device key and the storage key as encrypted and stored to a load function of the Hardware Security Module in a load request, retrieving, from the load function of said Hardware Security Module, the storage key encrypted using the provided secure device key and the HSM key K, and an APDU_putkey command, encrypted using the provided secure device key, to put the retrieved storage key Ks also encrypted using the provided secure device key, overwriting the storage key as stored with the storage key encrypted using the secure device key and the HSM key returned by the Hardware Security Module in the previous step, forwarding the APDU_putkey command to the secure device, sending the script as stored to the secure device, said method further comprising a reload subscription phase comprising the following steps of, in the case a previous loading is appearing during the checking step:

providing the secure device key and the storage key as encrypted and stored to a reload function of the hardware security module in a reload request, retrieving, from the reload function of said Hardware Security module, the storage key encrypted using the provided secure device key and the HSM key and an APDU_putkey command, encrypted using the provided secure device key, to put the retrieved storage key Ks also encrypted using the provided secure device key, forwarding the APDU_putkey command to the secure device, sending the script as stored to the secure device.

Therefore, the method according to the present invention prevents any script to be loaded on two different secure devices as the storage key is stored encrypted using the secure device key. If the storage key was previously stored after having been loaded on another secure device, even if the method is applied as if it was not previously loaded, it will not be possible for the secure device to decrypt the storage key. More precisely, the decryption using the secure device key will not give a correct storage key but the storage key encrypted using the other secure device key.

The script will remains unreadable and not executable and no cloning of the corresponding subscription will be observed. The usage of the HSM to trans-cipher keys and to build the command APDU_PUTKEY provides a good level of security.

In a particular embodiment, the load and reload functions of said Hardware Security Module are such that the APDU_putkey command is encrypted using a session key computed using the secure device key and a random data exchanged with the secure device.

This embodiment enables to have different keys for each output of the load and reload functions.

In a particular implementation, the secure device key is a keyset comprising at least two static sub-keys, one of them being used, by the load and reload functions, to encrypt the storage key an the other being used, by the load and reload functions, to compute the session key.

Such an implementation exploits the structure of the secure element keys as generally provided on such elements.

According to a preferred implementation, said secure device key is a keyset comprising at least two sub-keys: encryption sub-key and decryption sub-key, wherein provisioning server and secure devices communicate using a derived session encryption sub-key derived from the encryption sub-key and some pseudo random data known only by the provisioning server and the secure device, wherein the load function of said Hardware Security Module, returns, to overwrite the previously stored key, the storage key after decrypting using the HSM key and encrypting using the provided secure device decryption sub-key and the HSM key used, and, to be sent to the secure device, an APDU_putkey command, encrypted by a derived session secure device encryption sub-key, to put the storage key encrypted using the provided secure device decryption sub-key on the secure device, wherein the reload function of said Hardware Security module returns the storage key encrypted using the secure device decryption sub-key and the HSM key and an APDU_putkey command, encrypted by a derived session encryption sub-key, to put the retrieved storage key encrypted using the secure device decryption sub-key on the secure device.

This embodiment exploits a classical type of structure of the secure device key to process the different encryption/decryption according to the invention. Different sub-keys of the secure device key are used along the steps of the method of the invention avoiding always the same key to be used.

According to a particular implementation, the step of checking if the given script has been loaded on any secure device uses a history of the scripts' loadings stored in the provisioning server.

This implementation enables the provisioning server to locally check if the script has already been loaded on a secure device.

According to another particular implementation, the step of checking if the given script has been loaded on any secure device uses a history of the scripts' loadings stored in the targeted secure device.

This implementation enables to free the provisioning server of the task to keep in memory all the history but each of the secure device has typically an identifier of the different scripts which have been loaded on it. Each secure device is able to send such an identifier to the provisioning server under request.

The present invention also relates to a hardware security module comprising at least an HSM key, a load and a reload function respectively triggered by a load request and a reload request:

the load function receiving two keys encrypted using the HSM key, encrypting the second key using the first and outputting the thus encrypted key further encrypted using the HSM key and an APDU_putkey command, encrypted using the secure device key, to put the retrieved storage key Ks on the secure device, the reload function receiving two keys encrypted using the HSM key and outputting the second encrypted key and an APDU_putkey command, encrypted using the secure device key, to put the retrieved storage key Ks encrypted using the secure device decryption sub-key on the secure device.

Such a hardware security module enables to implement the invention. It receives the keys as stored in the provisioning server and applies one of the both function to the received keys in order to output the command APDU_PUTKEY and the storage after trans-ciphering.

According to a particular embodiment, the load and reload functions are such that the APDU_subkey command is encrypted using a session key computed using the secure device key and a random data exchanged with the secure device.

According to a particular implementation, the secure device key is a keyset comprising at least two static sub-keys, one of them being used, by the load and reload functions, to encrypt the storage key and, the other being used, by the load and reload functions, to compute the session key.

According to a preferred implementation, the hardware security module of the invention is such that said secure device key is a keyset comprising at least two sub keys: encryption sub-key and decryption sub-key, such that provisioning server and secure devices communicates using a derived session encryption sub-key derived from the encryption sub-key and some pseudo random data known only by the provisioning server and the secure device, such that the load function of said Hardware Security Module returns, to overwrite the previously stored key, the storage keys, after decrypting using the HSM key and encrypting using the secure device decryption sub-key and the HSM key used, and, to be sent to the secure device, an APDU_putkey command, encrypted by a derived session encryption sub-key, to put the retrieved storage key Ks encrypted using the decryption sub-key on the secure device, and such that the reload function of said Hardware Security module returns the storage key encrypted using the secure device decryption sub-key and the HSM key and an APDU_putkey command, encrypted by a derived session encryption sub-key, to put the retrieved storage key Ks encrypted using the secure device decryption sub-key on the secure device.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed, Other advantages and novel features will become apparent from the following detailed description when considered in conjunction with drawings and the disclosed embodiments are intended to include all such aspects and their equivalents.

DETAILED DESCRIPTION OF EMBODIMENTS OF THE INVENTION

Figure 1:
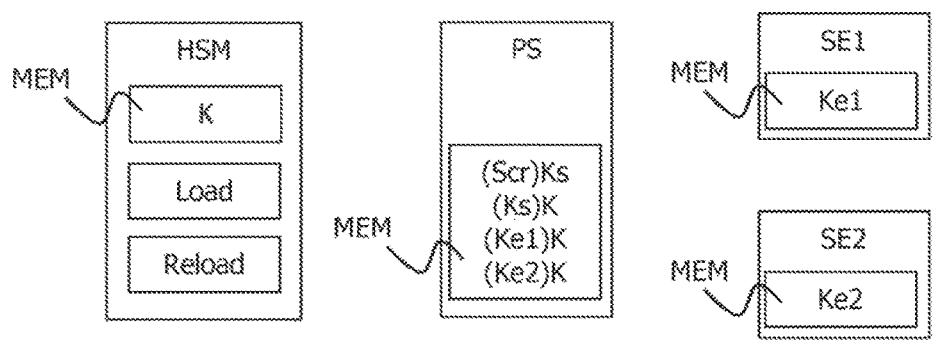
FIG. 1 shows an environment comprising an hardware security module, a provisioning server and at least a secure device and in which the invention is advantageously implemented.

For a more complete understanding of the invention, the invention will now be described in detail with reference to the accompanying drawings. The same elements have been designated with the same reference numerals in the different drawings. For clarity, only those elements and steps which are useful to the understanding of the present invention have been shown in the drawings and will be described.

FIG. 1 schematically shows the environment in which the invention is advantageously implemented. It comprises a hardware security module HSM, a provisioning server PS and, here, two secure devices SE1 and SE2. Typically SE1 and SE2 are secure elements.

The HSM, stores at least one HSM key K and has at least two trans-cipher functions Load and Reload according to the invention.

The trans-cipher load function returns, given two cryptograms [k1]K and [k2]K, returns an APDU_PUTKEY to put k2 encrypted by k1 and K:[[k2]k1]K. The key k2 encrypted using k1 end K is also output. The trans-cipher reload function returns, given two cryptograms [k1]K and [[k2]k1] K, returns an APDU_PUTKEY to put k2 encrypted by k1 and K:[[k2]k1]K.

The provisioning server PS stores scripts (Scr)Ks relative to the creation of different subscriptions. These scripts (Scr)Ks are stored after encryption using a storage key Ks. The provisioning server PS also stores the storage key Ks after its encryption by the HSM using the HSM key K and as many secure elements' keys (Ke1)K, (Ke2)K as there are secure, elements in the environment in which the invention is implemented, said secure elements' keys being stored after encryption by the HSM using the HSM key K.

At last each secure element SEi stores its own secure element key Kei.

Figure 2A:
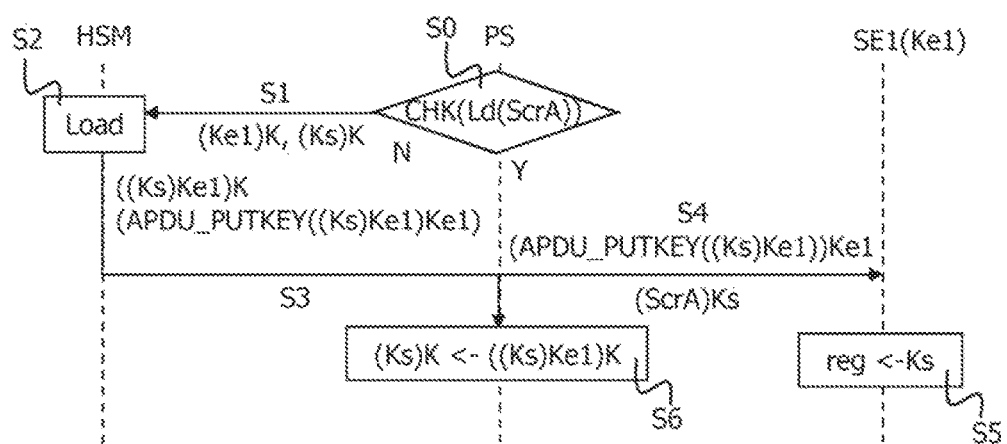
FIGS. 2A, 2B and 2C are sequence diagrams showing the different steps of the invention in different loading situations.

FIG. 2A shows the sequence of steps of the invention when the load of a non previously loaded script ScrA of a subscription on a eUICC SE1 is requested. This eUICC SE1 is typically a secure element.

In a step S0, the provisioning server PS that stores the scripts corresponding to the subscriptions checks if the script ScrA has yet been loaded. FIG. 2A corresponds to the case N where it has not been previously loaded.

In a step S1, the provisioning server PS sends the storage key Ks and the secure element key Ke1 as stored and thus as encrypted using the HSM key K to the function Load of the hardware secure module HSM.

When the secure element key is a keyset comprising at least two sub-keys: encryption sub-key Ke1-enc and decryption sub-key Ke1-dek, the couple of these values (Ke1-enc, Ke1-dek) are previously encrypted using said HSM key as secure element key Ke1. Ke1-enc will be used to create Ke1-Senc which is a session encryption key.

In a step S2, the function Load of the HSM trans ciphers the two received encrypted keys. The HSM then outputs the storage key Ks encrypted by the secure element key Ke1 and by the HSM key K and a command APDU_PUTKEY, the secure element SE1 to put the storage key Ks encrypted by the secure element key Ke1, said command being further encrypted with the secure element key Ke1.

In the case the secure element key Ke1 is a keyset, the Load function of the HSM then outputs the storage key Ks encrypted using one of the static sub-key of the key set Ke1, for example the secure element decry sub-key Ke1-dek, and by the HSM key K and a command APDU_PUTKEY for the secure element SE1 to put the storage key Ks encrypted by the secure element decryption sub-key Ke1-dek, said command being further encrypted by a derived session secure element encryption sub-key Ke1-senc on the secure element.

In a step S3, the encrypted storage key ((Ks)Ke1)K and the command APDU_PUTKEY are sent to the provisioning server PS.

The provisioning serves PS forwards the APDU_PUTKEY to the secure element SE1 in a step S4. Advantageously, the script (ScrA)Ks is also sent to the secure element SE1 in step S4. The script is the one as stored in provisioning server, unchanged, i.e. still encrypted by the storage key Ks. It is here noted that the script ScrA and the APDU can be sent in distinct messages, so, strictly speaking, in distinct steps.

As the secure element SE1 has the secure element key Ke1, it access the APDU_PUTKEY and the storage key Ks. In a step S5, the storage key Ks is stored in a register reg after decryption using the secure element key Ke1 in the secure element SE1.

The secure element SE1 then decrypts the scripts using Ks and executes the script ScrA which create the subscription on secure element SE1. When keyset is used as secure element key, as the secure element SE1 has the two sub-keys, it is able to decrypt the storage key as well as, subsequently, the script ScrA.

In a step S6, the provisioning server PS overwrites in database storing an history of the loads the previously stored storage key as encrypted using HSM key K by the storage key as received from the HSM, i.e. the storage key encrypted using the secure element key and the HSM K ([Ks]Ke1)K.

In parallel, it advantageously records in database that the script ScrA has been loaded on the secure element SE1. This information can also be stored in the secure element that is then asked by the provisioning server PS during the step S0.

Figure 2B:
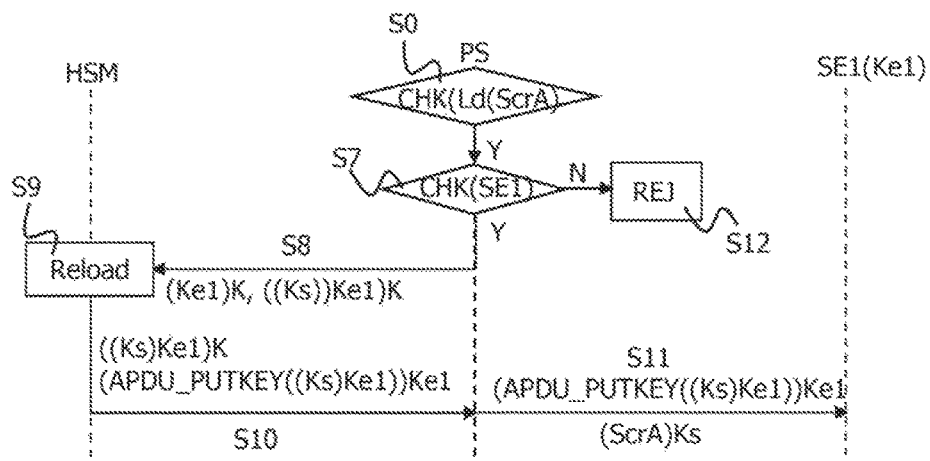

FIG. 2B shows the sequence of steps of the invention when the load of a previously loaded script ScrA of a subscription on a eUICC SE1 requested. This figure corresponds to the case Y in step S0 where the script ScrA is detected as having already been loaded. Then in a step S7, it is checked if the load was done on the secure element SE1. If yes, case Y, it means that the provisioning server PS receives a request to load the script ScrA again on the secure element SE1.

In this case, the provisioning server PS sends the storage key Ks and the secure element key Ke1 as stored to the function Reload of the hardware secure module HSM. Thus the secure element key Ke1 as encrypted using the HSM key K and the storage key as encrypted using the secure element key Ke1 and the HSM key K are received by the Reload function in a step S8. In a step S9, the function Reload of the HSM trans-ciphers the two encrypted keys. The HSM then outputs the storage key Ks encrypted by the secure element key Ke1 and by the HSM key K as it was indeed previously stored. A command APDU_PUTKEY is also output for the secure element SE1 to put the storage key Ks encrypted by the secure element key Ke1, said command being further encrypted with the secure element key Ke1.

The secure element key Ke1 is effectively always used to encrypt the command. However, in practice, Ke1 is used to generate dynamic keys that are used for the encryption itself.

Thus when the secure element key Ke1 is a key set, each time an APDU command is generated, a new session key: Ke1-Senc is computed with a new random data and one static sub-key, typically sub-key Ke1-enc. It has thus to be noted that the output of the load and of the reload function are always distinct as different session keys are indeed used for the encryption.

In practice the output is constituted of the script encrypted using Ks and [ScrA]Ks and the APDU_PUTKEY command [[APDU_PUTKEY(Ks)]Ke1-dek]Ke1-Senc. The command APDU_PUTKEY is thus encrypted using the dynamic session key Ke1-Senc while the key Ks is itself encrypted using one of the static sub-keys, here the decryption key Ke1-dek.

In a step S10, the output storage key and the output command are sent to the provisioning server PS which lets the previously stored value [Ks]Ke1 in database and forwards the command APDU_PUTKEY to the secure element SE1 with, advantageously, the script (ScrA)Ks as encrypted using the storage key.

The secure element SE1 has now the storage key Ks and is able to decrypt the script ScrA. It then executes the script ScrA which creates the corresponding subscription on the secure element SE1.

Let us now consider the case where, as schematically illustrated on FIG. 2B with case N of step S7, the script ScrA has already been loaded on another secure element. In a normal functioning, the check step S7 detects that the script was previously loaded but not on the secure element, case N. The request is thus directly rejected in a step S12.

Figure 2C:
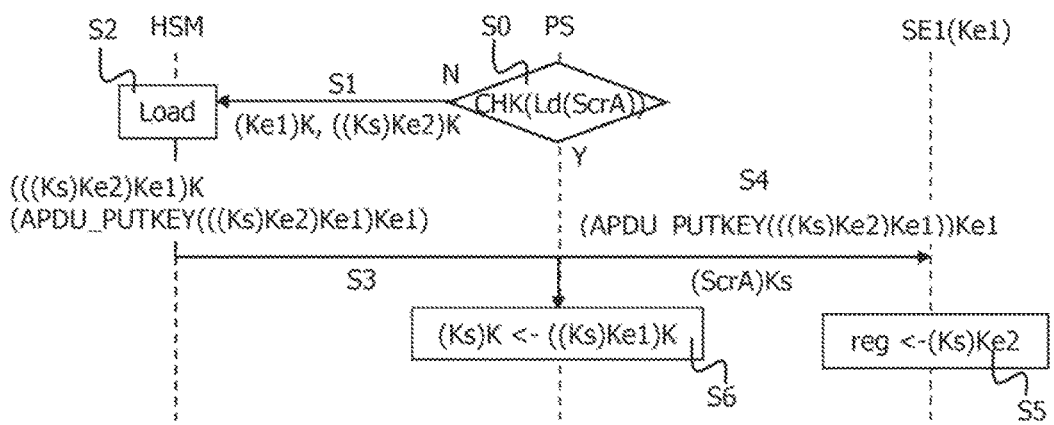

The invention particularly solves the situation where an attacker can alter the database where the history of the loads is stored and remove the record that the script has been loaded on the secure element SE1. So, as illustrated on FIG. 2C, let us now consider the case where the database where the history of the loads has been corrupted in such a way that the output of the check implemented in step S0 is corresponding to the case N where the script ScrA has never been loaded while it was previously loaded on another secure element SE2 having a key Ke2.

In a step S1, the provisioning server sends the storage key ((Ks)Ke2)K as previously stored, i.e. encrypted using the other secure element key Ke2 with the secure element key Ke1 as encrypted using the HSM key K to the Load function of the HSM.

The Load function of step S2 outputs the storage key (((Ks)Ke2)Ke1)K encrypted by the other secure element key Ke2, the secure element key Ke1 and by the HSM key K. The output and forwarded command APDU_PUTKEY has a key that is not Ks but (Ks)Ke2.

The sent script is unchanged and thus still encrypted by Ks alone to the secure element SE1. The secure element cannot decrypt the script with (Ks)Ke2 and the script fails to execute. The subscription is thus not installed on SE1. Thus, with the invention, when the script has been loaded previously on a secure element but the record of this loading has been removed from the history, the subscription cannot be installed in another card because Ks cannot be retrieved.

When the script ScrA has been loaded on secure element SE1, SE1 can keep history of the subscription identifier. Each time the provisioning server PS wants to download the same subscription profile, it asks the secure element SE1 if such profile has already been downloaded on it.

If not, a new script ScrB is used. If yes, the secure element SE1 sends the identifier of the subscription to use.

The provisioning server PS then retrieves the script corresponding to the received identifier and reuses the [Ks]Ke1 previously stored.

In the above detailed description, reference is made to the accompanying drawings that show, by way of illustration, specific embodiments in which the invention may be practiced. These embodiments are described in sufficient detail to enable those skilled in the art to practice the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. The above detailed description is, therefore, not to be taken in a limiting sense, and the scope of the present invention is defined only by the appended claims, appropriately interpreted, along with the full range of equivalents to which the claims are entitled.

In particular, any reference signs in the claims shall not be construed as limiting the scope of the invention. The wording "comprising" does not exclude other elements or steps. The wording "a" or "an" does exclude plurality.

The invention claimed is:

1. A method to manage subscriptions in a provisioning server (PS) able to communicate with a Hardware Security Module (HSM) having an HSM key (K), said method comprising the preliminary steps of:
storing, in the provisioning server (PS), scripts (Scr) corresponding to the creation of subscriptions, said scripts being encrypted using a storage key (Ks), said scripts ((Scr)Ks) being intended to be loaded in secure devices (SEi), each of these secure devices (SEi) being associated with a secure device key (Kei),
storing said storage key (Ks) and said secure device keys (Kei) encrypted using the HSM key (K) in the provisioning server (PS),
said method further comprising a load subscription phase comprising the following steps of, when the provisioning server (PS) is requested to load a given script (ScrA) on a secure device (SE1):
checking if the given script (ScrA) has been loaded on any secure device,
in the case (N) such a previous loading is not appearing, providing the secure device key ((Ke1)K) and the storage key ((Ks)K) as encrypted and stored to a load function of the Hardware Security Module (HSM) in a load request,
retrieving, from the load function of said Hardware Security Module (HSM), the storage key ((Ks)Ke1)K encrypted using the provided secure device key (Ke1) and the HSM key K, and an APDU_putkey command ((APDU_PUTKEY((Ks)Ke1))Ke1), encrypted using the provided secure device key (Ke1), to put the retrieved storage key ((Ks)Ke1) also encrypted using the provided secure device key (Ke1),
overwriting the storage key as stored ((Ks)K), with the storage key (((Ks)Ke1)K) encrypted using the secure device key (Ke1) and the HSM key (K) returned by the Hardware Security Module (HSM) in the previous step,
forwarding the APDU_putkey command ((APDU_PUTKEY((Ks)Ke1))Ke1) to the secure device (SE1), and sending the script (ScrA) as stored to the secure device (SE1), said method further comprising a reload subscription phase comprising the following steps of, in the case (Y) a previous loading is appearing during the checking step:
providing the secure device key ((Ke1)K) and the storage key (((Ks))Ke1)K) as encrypted and stored to a reload function of the hardware security module (HSM) in a reload request,
retrieving, from the reload function of said Hardware Security module (HSM), the storage key (((Ks)Ke1)K) encrypted using the provided secure device key (Ke1) and the HSM key (K) and an APDU_putkey command ((APDU_PUTKEY((Ks)Ke1))Ke1), encrypted using the provided secure device key (SE1), to put the retrieved storage key ((Ks)Ke1) also encrypted using the provided secure device key (Ke1),
forwarding the APDU_putkey command ((APDU_PUTKEY((Ks)Ke1))Ke1) to the secure device (SE1) and sending the script ((ScrA)Ks) as stored to the secure device (SE1), to avoid the possibility of subscription cloning on a plurality of secure devices.

2. The method to manage subscriptions according to claim 1, wherein the load and reload functions of said Hardware Security Module (HSM) are such that the APDU_putkey command ((APDU_PUTKEY((Ks)Ke1))Ke1) is encrypted using a session key (Ke1-senc) computed using the secure device key (Ke1) and a random data exchanged with the secure device (SE1).

3. The method to manage subscriptions according to claim 2, wherein the secure device key (Ke1) is a keyset comprising at least two static sub-keys, one of them being used, by the load and reload functions, to encrypt the storage key (Ks) and the other being used, by the load and reload functions, to compute the session key (Ke1-senc).

4. The method to manage subscriptions according to claim 3, wherein said secure device key (Ke1) is a keyset comprising at least two sub-keys: encryption sub-key (Ke1-enc) and decryption sub-key (Ke1-dek), wherein provisioning server (PS) and secure devices (SEi) communicate using a derived session encryption sub-key (Ke1-senc) derived from the encryption sub-key (Ke1-enc) and some pseudo random data known only by the provisioning server (PS) and the secure device (SEi), wherein the load function of said Hardware Security Module (HSM), returns, to overwrite the previously stored key, the storage key (((Ks)Ke1-dec)K) after decrypting using the HSM key (K) and encrypting using the provided secure device decryption sub-key (Ke1-dek) and the HSM key (K), and, to be sent to the provided secure device (SE1), an APDU_putkey command ((APDU-PUTKEY((Ks)Ke1-dek))Ke1-senc), encrypted by a derived session secure device encryption sub-key (Ke1-senc), to put the storage key (Ks) encrypted using the provided secure device decryption sub-key (Ke1-dek) on the secure device (SE1), wherein the reload function of said Hardware Security module (HSM) returns the storage key (((Ks)Ke1-dek) K) encrypted using the provided secure device decryption sub-key (Ke1-dek) and the HSM key (K) and an APDU_putkey command ((APDU-PUTKEY((Ks) Ke1-dek))Ke1-senc), encrypted by a derived session encryption sub-key (Ke1-senc), to put the retrieved storage key (Ks) encrypted using the provided secure device decryption sub-key (Ke1-dek) on the secure device (SE1).

5. The method according to claim 1, wherein the step of checking if the given script (ScrA) has been loaded on any secure device uses a history of the scripts' loadings stored in the provisioning server (PS).

6. The method according to claim 1, wherein the step of checking if the given script (ScrA) has been loaded on a given secure device (SE1) uses a history of the scripts' loadings stored in the targeted secure device (SE1).

7. A system comprising:
a hardware security module (HSM) including at least an HSM key (K), a load and a reload function respectively triggered by a load request and a reload request; and
a hardware provisioning server that:
store scripts (Scr) corresponding to the creation of subscriptions, said scripts being encrypted using a storage key (Ks), said scripts ((Scr)Ks) being intended to be loaded in secure devices (SEi), each of the secure devices (SEi) being associated with a secure device key (Kei), and
store said storage key (Ks) and said secure device keys (Kei) encrypted using the HSM key (K),
wherein:
the load function receives two keys (Ke1,Ks) encrypted using the HSM key (K), encrypts the second key (Ks) using the first and outputs the thus encrypted key (((Ks)Ke1)K) further encrypted using the HSM key (K) and an APDU_putkey command ((APDU_PUTKEY((Ks)Ke1))Ke1), encrypted using the first key (Ke1), to put the retrieved storage key (Ks) on a secure device (SE1),
the reload function receives two keys ((Ke1)K,((Ks) Ke1)K) encrypted using the HSM key (K) and outputs the second key ((Ks)Ke1) encrypted using the first key (Ke1) and an APDU_putkey command ((APDU_PUTKEY((Ks)Ke1))Ke1), encrypted using the secure device key (Ke1), to put the retrieved storage key ((Ks)Ke1) encrypted using the first key (Ke1) on the secure device (SE1), further wherein, in response to a request to load a given script (ScrA) on a secure device (SE1), the provisioning server is configured to:
checks if the given script (ScrA) has been loaded on any secure device,
in the case (N) such a previous loading does not appear, provide the secure device key ((Ke1)K) and the storage key ((Ks)K) as encrypted and stored to the load function of the Hardware Security Module (HSM) in a load request,
retrieve, from the load function of said Hardware Security Module (HSM), the storage key ((Ks)Ke1) K) encrypted using the provided secure device key (Ke1) and the HSM key K, and the APDU_putkey command ((APDU_PUTKEY((Ks)Ke1))Ke1), encrypted using the provided secure device key (Ke1), to put the retrieved storage key ((Ks)Ke1) also encrypted using the provided secure device key (Ke1),
overwrite the storage key as stored ((Ks)K), with the storage key (((Ks)Ke1)K) encrypted using the secure device key (Ke1) and the HSM key (K) returned by the Hardware Security Module (HSM),
forward the APDU putkey command ((APDU_PUTKEY((Ks)Ke1))Ke1) to the secure device (SE1), and
send the script (ScrA) as stored to the secure device (SE1),
and in the case (Y) a previous loading does appear during the checking step, the provisioning server is configured to:
provide the secure device key ((Ke1)K) and the storage key (((Ks))Ke1)K) as encrypted and stored to a reload function of the hardware security module (HSM) in a reload request,
retrieve, from the reload function of said Hardware Security module (HSM), the storage key (((Ks)Ke1) K) encrypted using the provided secure device key (Ke1) and the HSM key (K) and the APDU_putkey command ((APDU_PUTKEY((Ks)Ke1))Ke1), encrypted using the provided secure device key (SE1), to put the retrieved storage key ((Ks)Ke1) also encrypted using the provided secure device key (Ke1),
forward the APDU_putkey command ((APDU_PUTKEY((Ks)Ke1))Ke1) to the secure device (SE1), and
sends the script ((ScrA)Ks) as stored to the secure device (SE1), to avoid the possibility of subscription cloning on a plurality of secure devices.

8. The system as claimed in claim 7, wherein the load and reload functions are such that the APDU_putkey command ((APDU_PUTKEY((Ks)Ke1))Ke1) is encrypted using a session key (Ke1-senc) computed using the secure device key (Ke1) and a random data exchanged with the secure device (SE1).

9. The system as claimed in claim 8, wherein the secure device key (Ke1) is a keyset comprising at least two static sub-keys, one of them being used, by the load and reload functions, to encrypt the storage key (Ks) and the other being used, by the load and reload functions, to compute the session key (Ke1-senc).

10. The system as claimed in claim 9, wherein, said secure device key (Ke1) is a keyset comprising at least two sub-keys: encryption sub-key (Ke1-enc) and decryption sub-key (Ke1-dek), wherein the provisioning server (PS) and secure devices (Sei) communicate using a derived session encryption sub-key (Ke1-senc) derived from the encryption subkey (Ke1-enc) and some pseudo random data known only by the provisioning server (PS) and the secure device (SEi), wherein the load function of said Hardware Security Module (HSM) returns, to overwrite the previously stored key, the storage key (((Ks)Ke1-dek)K) after decrypting using the HSM key (K) and encrypting using the secure device decryption sub-key (Ke1-dek) and the HSM key (K), and, to be sent to the secure device (SE1), an APDU_putkey command ((APDU-PUTKEY((Ks)Ke1-dek))Ke1-senc), encrypted by a derived session encryption sub-key (Ke1-senc), to put the retrieved storage key (Ks) encrypted using the decryption sub-key (Ke1-dek) on the secure device (SE1), and wherein the reload function of said Hardware Security module (HSM) returns the storage key (((Ks)Ke1-dek)K) encrypted using the secure device decryption sub-key (Ke1-dek) and the HSM key (K) and an APDU_putkey command ((APDU-PUTKEY((Ks)Ke1-dek))Ke1-senc), encrypted by a derived session encryption sub-key (Ke1-senc), to put the retrieved storage key ((Ks)Ke1-dek) encrypted using the secure device decryption sub-key (Ke1-dek) on the secure device (SE1).

\* \* \* \* \*